United States Patent
Norton, Jr. et al.

(10) Patent No.: US 11,698,767 B1
(45) Date of Patent: Jul. 11, 2023

(54) DESIGNATED SHARE WINDOW FOR SHARING CONTENT DATA

(71) Applicant: Lenovo (Singapore) Pte. Ltd., Singapore (SG)

(72) Inventors: Robert James Norton, Jr., Raleigh, NC (US); Justin Michael Ringuette, Morrisville, NC (US); Sandy Collins, Durham, NC (US); Neal R Caliendo, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/699,347

(22) Filed: Mar. 21, 2022

(51) Int. Cl.
  *G06F 21/32* (2013.01)
  *G06F 3/14* (2006.01)
  *G06F 3/04842* (2022.01)

(52) U.S. Cl.
  CPC ........ *G06F 3/1454* (2013.01); *G06F 3/04842* (2013.01)

(58) Field of Classification Search
  CPC .... G06F 1/1626; G06F 1/1647; G06F 1/1649; G06F 1/165; G06F 1/1654; G06F 1/1692; G06F 1/203; G06F 3/1423; G06F 3/1454; G06F 3/147; G06F 3/04842; G06F 3/04886; G06F 21/32; G09G 2356/00
  See application file for complete search history.

(56) References Cited

U.S. PATENT DOCUMENTS

| | | | |
|---|---|---|---|
| 2008/0126480 A1* | 5/2008 | Hintermeister | H04L 41/18 709/204 |
| 2012/0011451 A1* | 1/2012 | Bansal | H04N 7/15 715/753 |
| 2020/0388248 A1* | 12/2020 | Kimata | G09G 3/20 |
| 2020/0389508 A1* | 12/2020 | Hashimoto | H04L 65/1069 |

* cited by examiner

*Primary Examiner* — Michael J Eurice
(74) *Attorney, Agent, or Firm* — Ference & Associates LLC (57) ABSTRACT

One embodiment provides a method, including: detecting an area of a display device of an information handling device of a user, designated as a share window; identifying, when the share window is in an active share state, a position of a first window on the display device with respect to the share window; and sharing, based upon the position of the first window on the display being within at least a portion of the share window, content data contained within the first window to a display device of at least one other user in communication with the information handling device of the user. Other aspects are described and claimed.

20 Claims, 3 Drawing Sheets

DESIGNATED SHARE WINDOW FOR SHARING CONTENT DATA

BACKGROUND

Presentations, whether in person or performed virtually, are traditionally performed with a type of reference imaging, for example, flow diagrams, systems diagrams, prototypes, and the like. Today, reference imaging is commonly digitally rendered by use of a computer. When sharing computer-generated imaging during a presentation, a presenter may access a storage device or another storage location, and thereafter share the computer-generated imaging to an audience. Accessing a device that may be operatively coupled to a display, for example, a projector, will regularly require a presenter to access an unfamiliar device, or require a user to couple a personal device to a foreign network. Additionally, or alternatively, when presenting in a virtual medium, for example, a video call, the accessing and sharing of a reference image through an application can become time consuming and cumbersome.

BRIEF SUMMARY

In summary, one aspect provides a method, including: detecting an area of a display device of an information handling device of a user, designated as a share window; identifying, when the share window is in an active share state, a position of one or more other windows on the display device with respect to the share window; and sharing, based upon the position of the first window windows on the display being within at least a portion of the share window, content data contained within the first window windows to a display device of at least one other user in communication with the information handling device of the user Another aspect provides an information handling device, including: a display device; a processor operatively coupled to the display device; a memory device that stores instructions executable by the processor; detect an area of the display device of an information handling device of a user, designated as a share window; identify, when the share window is in an active share state, a position of one or more other windows on the display device with respect to the share window; and share, based upon the position of the first window on the one or more displays being within at least a position of the share window, content data contained within the first window to the display device of at least one other user in communication with the information handling device of the user A further aspect provides a product, including: a storage device that stores code, the code being executable by a processor and, wherein executed by the processor, causes the product to: detect an area of the display device of an information handling device of a user, designated as a share window; identify, when the share window is in an active share state, a position of one or more other windows on the display device with respect to the share window; and share, based upon the position of the first window on the one or more displays being within at least a position of the share window, content data contained within the first window to the display device of at least one other user in communication with the information handling device of the user The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Accessing a storage device in order to obtain and share relevant reference images when presenting, requires a multi-step process that may vary across different devices. In conventional methods, a user will have to access a storage device, download a file of a reference image, and then instruct an application to display the reference image in a single location, for example, on a projector screen for an audience, or instruct an application to display the reference image on each device communicating virtually, for example, each device's display in communication over a video call. Additionally, accessing the relevant reference imaging using traditional methods requires a pre-loading of a reference image and/or additional time during a presentation to load a reference image to be presented. The multi-step process a presenter must undergo to provide a reference image for a presentation causes additional time to be spent either prior to presenting or while presenting in order to utilize a reference image.

Traditional selection of a reference image or the selection of an application to be presented is also subject to error.

Selection of the correct reference image or application when a presenter has multiple windows open, for example, multiple reference images and/or applications to be used during the presentation, multiple web browsers open for different tasks (e.g., personal, recreational), can cause a presenter to take more time switching between windows on a device, and/or can result in the selection of an incorrect window. For example, when requesting a window sharing application share content on a display device, it can be difficult to know or remember which window or screen will be shared. This frequently results in an undesired window or screen being shared. Thus, conventional techniques frequently result in sharing potentially irrelevant and/or personal information to an audience. This sharing of incorrect information can be both frustrating and time wasting for both the presenter and the audience.

Accordingly, an embodiment provides a method for sharing content data utilizing an active share widow present on a user's device. In an embodiment, a display of a user's device may contain a designated area for a share window, and when in an active share state, the active share widow may share content data determined to be within the designated area the active share window is occupying. The sharing of content data through the use of an active share window may provide a user with a less-time consuming method for accessing, and then sharing, reference images and/or applications to a plurality of attendees' devices. Additionally, when a user is presenting, a user may transition between relevant content data with ease in real-time because all the user has to do is drag content that the user wants to share to the active share window location. In an embodiment, the positioning of content data within the designated area of the active share window may be performed using traditional window manipulation methods, for example, a drag-and-drop method, a copy-and-paste method, minimizing, and the like. Such a method may allow a user to accurately share content data to be displayed on a plurality of devices in communication with a user device by use of a designated area containing active share window present on the display of the user device. Since the share window is located in the same place and is always the only thing shared, this minimizes the inadvertent sharing of undesired information.

The illustrated example embodiments will be best understood by reference to the figures. The following description is intended only by way of example, and simply illustrates certain example embodiments.

Figure 1:
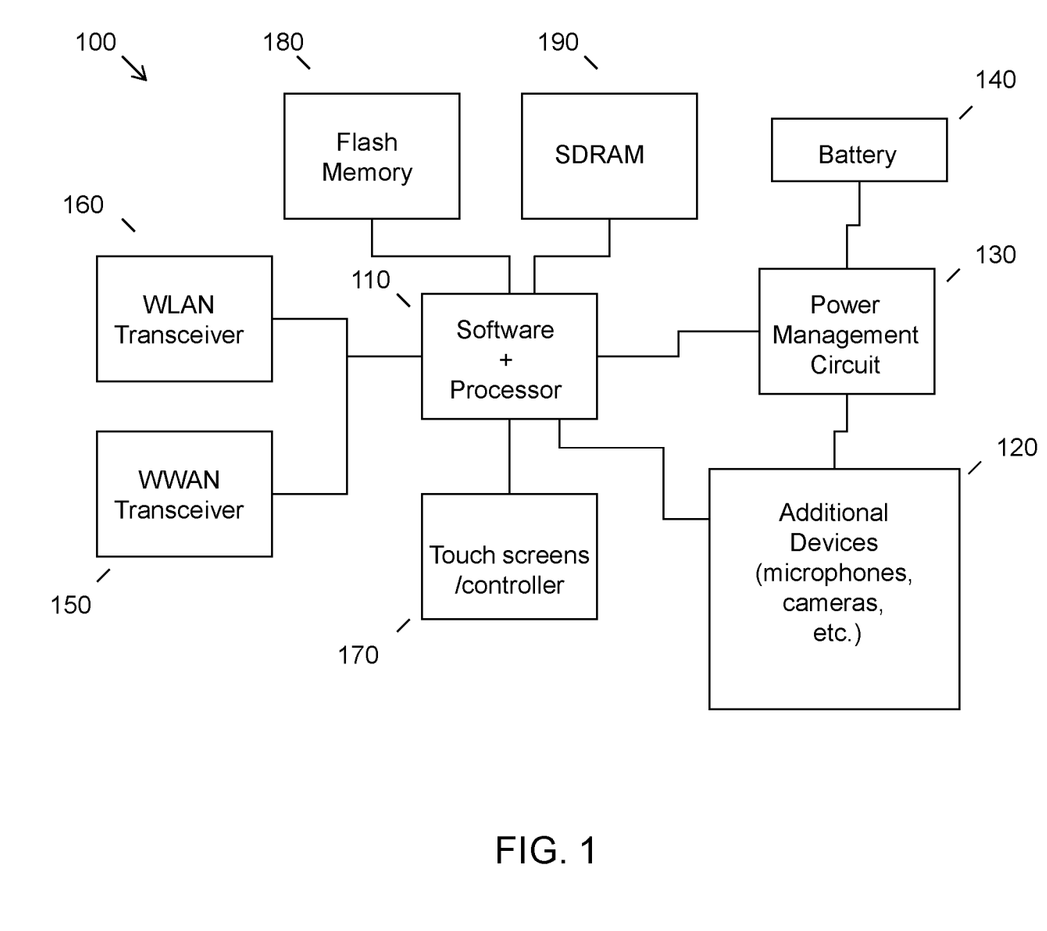
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
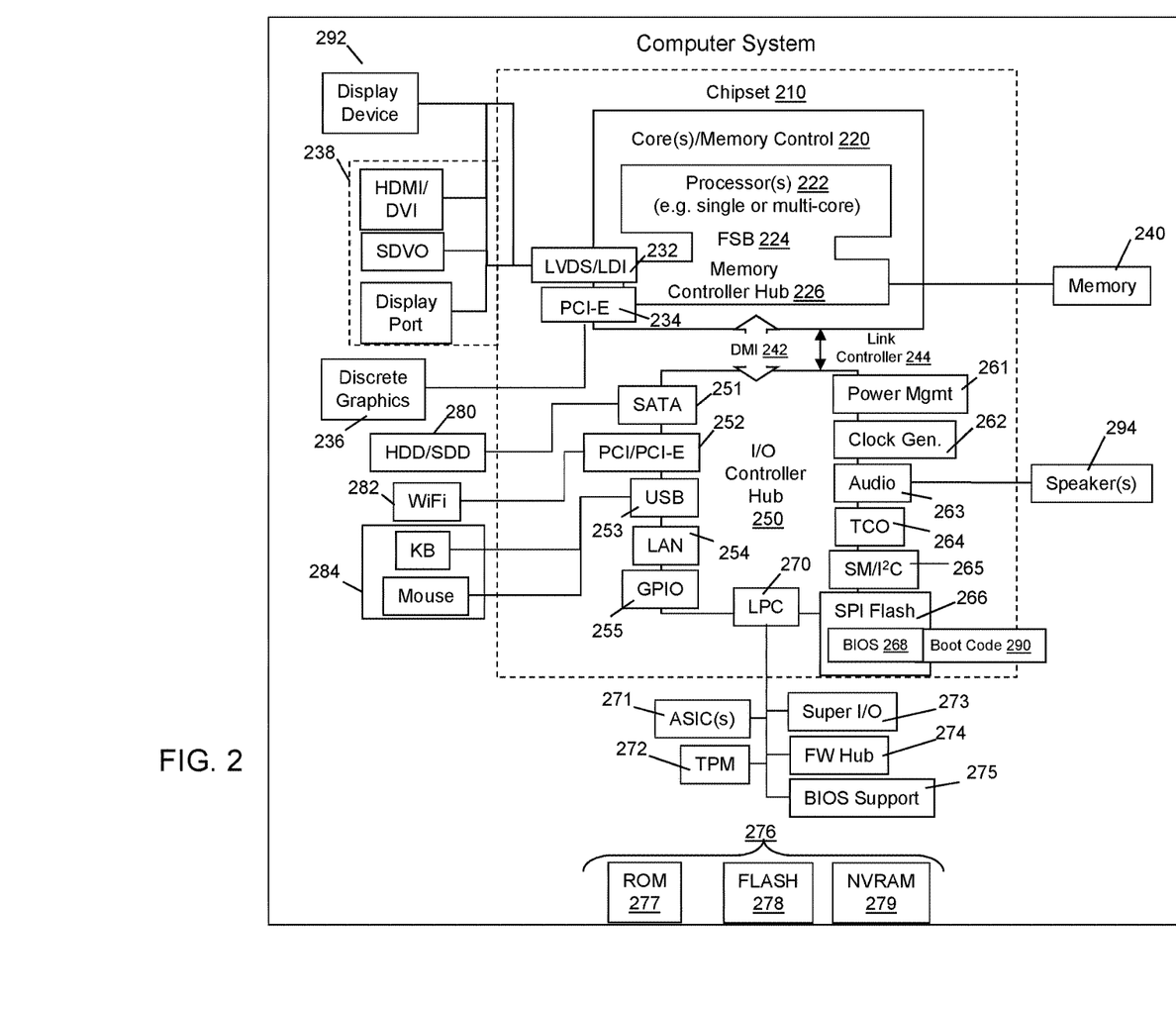
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems to share content data to one or more devices by use of an active share content window on the device of a user. For example, the circuitry outlined in FIG. 1 may be implemented in a tablet or smart phone embodiment, whereas the circuitry outlined in FIG. 2 may be implemented in a personal computer embodiment.

Figure 3:
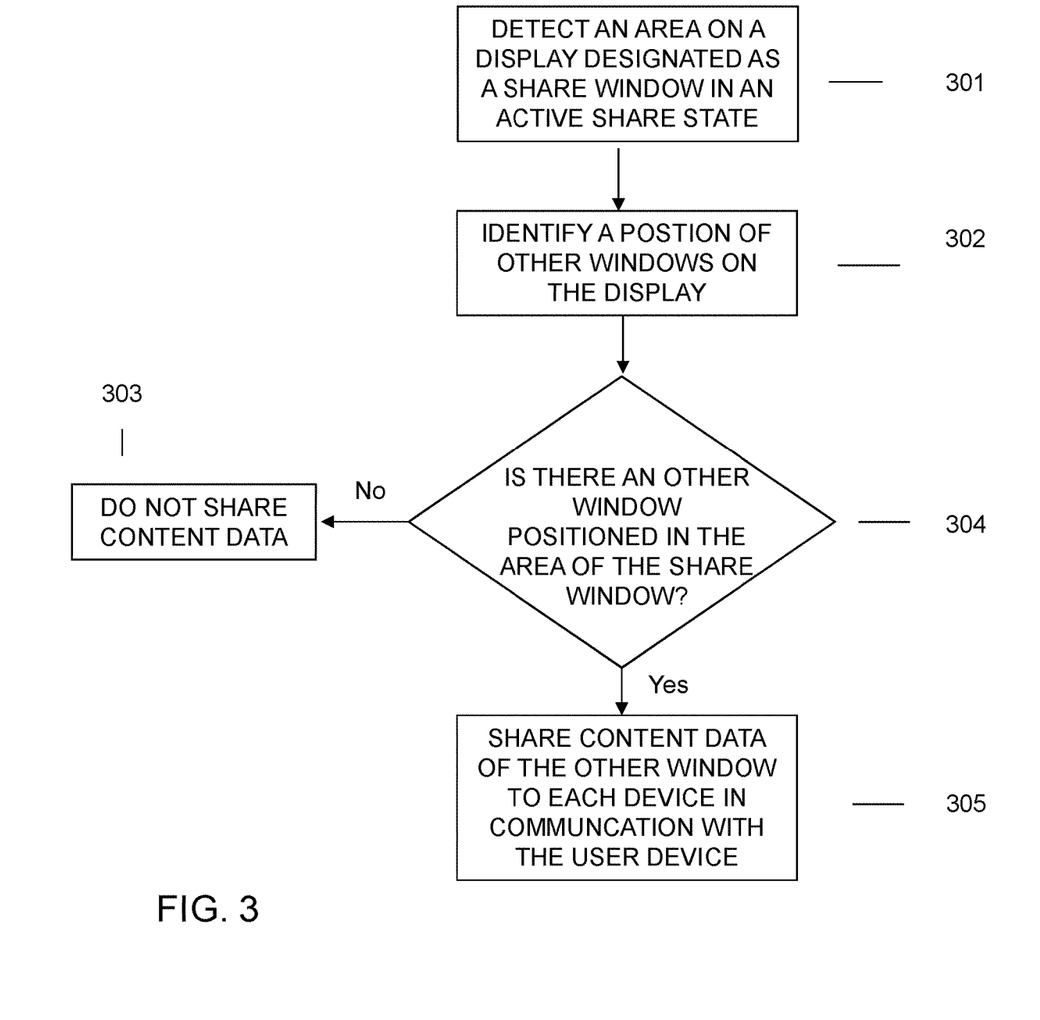
FIG. 3 illustrates an example method of using an area on a display that is designated as a share window to share content from a user device to one or more devices in communication with the user device.

FIG. 3 illustrates an example method for sharing content data over one or more devices in communication with a user device by use of a share content window present on the user device. The method may be implemented on a system which includes a processor, memory device, a central communication system, output devices (e.g., display device, etc.), input devices (e.g., keyboard, touch screen, mouse, microphones, sensors, etc.), image capturing devices, and/or other components, for example, those discussed in connection with FIG. 1 and/or FIG. 2. While the system may include known hardware and software components and/or hardware and software components developed in the future, the system itself is specifically programed to perform the functions as described herein to detect a designated area on a display is in an active share state, identify when a position of an application window and/or document window are present in the designated area in the active share state, and then share the content contained within the designated area. Additionally, the sharing content system includes features that are unique to the described system.

At 301, the sharing content system may detect an area on a display of a user device designated as a share window and that is in an active share state. As described herein, a user device may correspond to any device that may be coupled to one or more displays that may display content data. In an embodiment, for example, the display device may include a smart phone, a desktop computer, a laptop, a tablet, a smart watch, and the like. For ease of understanding throughout this application, continued reference to a user device is present, and specifically, a computer having one or more connected monitors, is utilized. However, it is important to regard such a use of a computer as a non-limiting example.

To detect to an area on the display designated as a share window in an active share state, an embodiment may detect that the user device is in communication with one or more other devices, each associated with an additional user communicating with the user device, and determine that the user is going to attempt to share content using a share window.

In other words, for example, when detecting the presence of an active share window in a designated area, the system may initially determine that the user communicating with additional users over an ongoing video-call active on the user device. As an example, the system may determine that an application supporting content sharing is active on the user device. The system may then determine from the detecting the designated area is present, that the share window is active since the video-call is currently happening and the user has provided an indication that content should be shared, for example, by selecting a sharing icon, selecting a presenter icon, and/or the like. In an embodiment, when detecting a share window in an active share state, communication between the user device and one or more other devices each associated with an attendee may be previously established.

In an embodiment, a system may detect an area on a display is designated as a share window but is not in an active state. On a display of the user device, a share window may contain no content. It is not until a user inputs content data to the share content window that content may be present in the share window, and only shared with additional devices when in an active state. The user may provide input to the system designating a particular area on one or more of the display devices as a share window.

This may include opening the share system and providing input that designates an area as a share window. Upon receiving input to share content within an active application, the designated share window area may become active as the sharing window. In an embodiment, the share window in use by a user on the display of a user device may occupy a predetermined location on the display of the device. For example, upon determining the use of the share content window, the share content window may be positioned in the top-left side of a display. The size of the share window, in an embodiment, may also be set at a standard size. These predetermined characteristics of the share window may be established as a default, set by a user, set by a corporation or entity, and/or the like.

Additionally, or alternatively, in an embodiment, the position, size, and/or other attributes of the share window may be dynamically adjusted by the user. The attributes of the share window of a user display device may be adjusted by use of traditional window adjust methodologies, for example, a drag-and-drop method, manual input values, and/or the like. In an embodiment, upon adjusting the position of the share window, the system may associate the share window with a quadrant of a display, and then recenter the share window in the quadrant. For example, if the majority of the share window is determined to be in the bottom-right quadrant of a display, the system may automatically adjust the share window to be present in the center of the bottom-right quadrant. Additionally, in an embodiment, upon a user adjusting the position of the share window on the display of the user device, the share window may remain in that position until readjusted by a user.

When determining a position of the share window in a system with multiple displays, an embodiment may designate a portion of one of the multiple displays connected to the user device. For example, a user may elect the top-left corner of a first display device containing three total displays. Additionally, or alternatively, in an embodiment consisting of multiple displays, a user may assign an entire display as the share window. For example, the user may assign the entire third display in a three-display system setup as the share window, and then, as will be discussed, the content data present anywhere on the third display device may be shared.

Dynamically adjusting at least one characteristic or attribute of the share window may also consist of, in an embodiment, adjusting a size of the share window. Adjusting the size of the window may provide a user with the ability to place a share window in any position at any size on a display; thus, potentially maximizing and/or more thoroughly utilizing space on at least one display. In an embodiment, dynamically adjusting the share window may include changing the height and/or width of the share window. Such dynamic adjustment of the share window characteristics may be performed using conventional methods, for example, click-and hold and moving outward to widen a window, click-and hold and moving upward to increase the height of the window, click-and hold a corner of the window and move diagonally to adjust the window size, manual input of size values, and the like. In an embodiment, a user may elect to decrease the width and/or the height of the share window utilizing one or more similar methods.

The detecting of an area on a display designated as a share window in an active state, may designate any size and/or position of a display within a system of one or more displays as the share window. The share window may thereafter be determined to be in an active state if the system detects that the user device is in communication with one or more other devices each associated with one or more attendees of a virtual meeting and the user has provided input that content should be shared.

In addition to the area on a display designated as a share window, one or more displays of the user device may contain other windows, separate from the share window, that may contain content data. In an embodiment, the system may identify a position of one or more other windows on the display at 302. This identification may occur in an embodiment with a share window in an inactive state, or, in an embodiment when the share window is determined to be in an active state. For ease of understanding through the specification, when identifying a position of the other windows on a display, the share window will be determined to be in an active state. However, it is important to remember that the identification of the position of one or more other windows may occur while the share window is in an inactive state, when the user is not in a conference or other meeting, or the like.

When identifying a position of one or more other windows on the display, the system may determine the position of the other windows in relation to the share window. The determining the positioning may be relation to the entirety of the other window or may be with respect to a particular portion of the other window, for example, the top-left corner of each of the other windows. In other words, the content sharing may occur when the entire other window is within the designated share window, when a particular portion of the other window is in the designated share window, when a majority of the other window is within the designated share window, and/or the like. The portion, amount, and/or the like, that needs to be in the share window to share the content can be a default setting, set by the user, and/or the like.

Identifying a position of the one or more other windows on the display may ultimately be used to determine if there is one or more other windows positioned in the area of the share window. As mentioned previously, when the share widow is determined to be an active share window and the system is determining if there is another window positioned in the area of the share window at 304, the system is trying to determine whether to share content data of the one or more other windows to each device in communication with the user device at 305. When it is determined that no other window is positioned in the area of the share window at 304, the system may not share content data at 303.

However, prior to determining there whether there is one or more other windows positioned in the area of the share window at 304, identifying a position of the one or more other windows on a display at 302, may include determining a portion of the other window is present in the active share window. As discussed, whether the other window is determined to be within the share window may be based upon an amount of the window within the share window, a particular portion of the window being with the share window, and the like. For example, when identifying a position and determining there is at least one other window positioned in the area of the share window, the position of the at least one other window may be completely within the share window. For example, the other window present on a display may contain a flow diagram describing a new business method, and the window itself may be present, in its entirety, within the share window. The system may then share the content data of flow diagram.

The position of the other window may be identified in relation to a portion of the window, for example, the top-left corner of a window. In this example, it is determined that a portion of the window is present within the share window, the share window may share all the content data present it the other window, even though only a portion of the window was present in the designated area of the active share window. However, if a different portion of the window were in the share window, the content of the other window will not be shared. In an embodiment, a threshold amount of a window may be necessary when determining if a portion of the window is enough to share the content data. For example, in an embodiment, a threshold value may be set at half-or-more of the window that must be positioned within the active share window in order to share the content data of the other window. On the other hand, in the example, if less than half of the other window is present in the share window, no content data may be shared.

Additionally, in another embodiment, when identifying a position of the one or more other windows, and determining that a portion of the other window is positioned in the area of the share window, the system may only share the content data overlapping the share window border. In other words, the system may share the content data present on the portion of the other window positioned within the share window. In other words, all the content data present in the other window is not shown; only the content data present in the portion positioned in the share window.

In identifying a position of the one or more other windows and then determining if there is at least one other window positioned in the area of the share window, a user may adjust the position of one or more windows by either adding or removing a window from the active share window. The user may adjust the position of one or more windows on the display of a device using traditional methods. For example, a user may use a drag-and-drop method that may adjust the position of the other window from being outside the share window to positioned inside the active share window or vice versa. As another example, a user may elect to adjust the position of the other window from within the share window to outside of the share window. The method for user adjustments to the position of the one or more other windows on a display may be any traditional window adjustment techniques, for example, keyboard commands, cut-and-paste, and the like.

When identifying the position of one or more other windows present in the active share window, the system may identify one or more layers of one or more other windows. One or more windows positioned in the share window may overlap, for example, a window containing clothing content data may overlap a second window containing map content data, but both being within the share window. The system may recognize that each of the two windows are present in the active share window. However, the top layer of the other window overlapping (e.g., the clothing content data) may be shared. Now, if the user removes, or minimizes, the clothing content data window from the share window, the mapping content data may be shared through the active share window. In other words, overlapping windows may cause windows underneath to not be shared.

Sharing content data of the one or more other windows to each device in communication with the user device at 305, shares the content data within the share window in real-time. Sharing the content may include sharing content in addition to the content contained within the other windows. For example, any motions or content within the share window may be shared. As an example, if the user is utilizing the drag-and-drop method to adjust the position of the one or more windows, each device of an attendee in communication with the user device may witness the dragging and dropping motion of the windows on the display of their device. Additionally, or alternatively, using the example consisting of one or more overlapping other windows comprising content data, the minimizing of a window or the removal of the window from the active share window is shared in real-time.

The system may un-share content data present within one or more other windows removed, or minimized, from the share window. Upon the removal of a window from the share window, content data contained within the removed window will no longer be shared to one or more devices communicating with the user device. Since the sharing may be dependent on a portion or amount of the window contained within the share window, the un-sharing may be based upon similar attributes. For example, if to share content the upper-left corner of the window needs to be within the share window and the user moves the window so that the upper-left corner of the window is no longer in the share window, the content within the window may no longer be shared even if other portions of the window are still within the share window.

Un-sharing may also occur if the user toggles an active state of the share window. For example, if the user would like to change the shared content data but does not want the attendees to see the transition between the content data windows, a user may elect to deactivate the share window for a desired amount of time, and may reactivate the share window when the user would like to continue sharing content data.

The system may be able to determine that a user is finished with a presentation and may then stop sharing content data. Thus, the system may automatically toggle the active share window to being inactive. Additionally, or alternatively, in an embodiment, the system may determine that the user is actively speaking and may toggle the share window from an inactive state to an active state, thereby sharing content data present in the now active share window. These automatic sharing techniques may be triggered by use of, but not limited to, audio detection, image capturing, motion detection, and the like. Un-sharing may also occur when the user is no longer the presenter, no longer a part of the conference application, starts working at a different unrelated window, or other actions that are indicators the user no longer wants to share content data.

The various embodiments described herein thus represent a technical improvement to conventional methods of sharing content data to one or more devices in communication with a user device. Rather than using traditional methods that require a multi-step process to share content data, the described system and method utilizes an active share window that shares content data positioned within the share window in real-time. The system is able to quickly transition between content data types by use of traditional window adjustment methods, and standard device commands. Such an embodiment may allow a system to transition between content data windows, or types, with ease and minimal time consumption. Additionally, since a specific portion of the user display device is designated as a share window, the user does not have to remember or fumble with identifying the content that is actually being shared, which reduces user frustration and time.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting an area of a display device of an information handling device of a user, designated as a share window, wherein the share window comprises a predetermined area on the display device;
    identifying, when the share window is in an active share state, a position of a first window on the display device with respect to the share window, wherein the position of the first window is movable with respect to the share window; and
    sharing, based upon the position of the first window on the display device being within at least a portion of the share window, content data contained within the first window to a display device of at least one other user in communication with the information handling device of the user.

2. The method of claim 1, comprising identifying the first window is no longer within the at least a portion of the share window; and
    un-sharing the content data contained within the first window.

3. The method of claim 1, wherein the information handling device comprises multiple display devices and wherein second content data of windows on another of the multiple display devices not having a designated share window is not shared.

4. The method of claim 1, wherein content data of a second window not within the at least a portion of the share window is not shared.

5. The method of claim 1, wherein the identifying comprises identifying a particular portion of the first window is within the active share state; and
    wherein the sharing comprises sharing all the content data contained within the first window.

6. The method of claim 1, wherein determining the active share state of the share window comprises receiving a user selection to stop sharing the content data and switching the share window to an inactive state.

7. The method of claim 1, wherein the sharing comprises real-time sharing of content data.

8. The method of claim 1, wherein determining the share window is in an active share state comprises detecting the information handling device is in communication with an information handling device of the at least one other user and detecting input from the user indicating content data of the display device is to be shared with the at least one other user.

9. The method of claim 1, wherein the detecting comprises identifying a dynamically adjustable characteristic of the share window.

10. The method of claim 9, wherein the dynamically adjustable characteristic is from the group consisting of: a size of a share window and a window position designator for content data to be shared.

11. An information handling device, comprising:
    a display device;
    a processor operatively coupled to the display device;
    a memory device that stores instructions executable by the processor:
    detect an area of the display device of the information handling device of a user, designated as a share window, wherein the share window comprises a predetermined area on the display device;
    identify, when the share window is in an active share state, a position of a first window on the display device with respect to the share window, wherein the position of the first window is movable with respect to the share window; and
    share, based upon the position of the first window on the display device being within at least a position of the share window, content data contained within the first window to the display device of at least one other user in communication with the information handling device of the user.

12. The information handling device of claim 11, comprising identifying the first window is no longer within the at least a portion of the share window; and
    un-sharing the content data contained within the first window.

13. The information handling device of claim 11, wherein the information handling device comprises multiple display devices and wherein second content data of windows on another of the multiple display devices not having a designated share window is not shared.

14. The information handling device of claim 11, wherein content data of a second window not within the at least a portion of the share window is not shared.

15. The information handling device of claim 11, wherein the identifying comprises identifying a particular portion of the first window is within the active share state; and
    wherein the sharing comprises sharing all the content data contained within first window.

16. The information handling device of claim 11, wherein determining the active share state of the share window comprises receiving a user selection to stop sharing the content data and switching the share window to an inactive state.

17. The information handling device of claim 11, wherein the sharing comprises real-time sharing of content data.

18. The information handling device of claim 11, wherein determining the share window is in an active share area state comprises detecting the information handling device is in communication with an information handling device of the at least one other user and detecting input from the user indicating content data of the display device is to be shared with the at least one other user.

19. The information handling device of claim 11, wherein the detecting comprises identifying a dynamically adjustable characteristic of the share window.

20. A product, comprising:
a storage device that stores code, the code being executable by a processor and, wherein executed by the processor, causes the product to:
detect an area of a display device of an information handling device of a user, designated as a share window, wherein the share window comprises a predetermined area on the display device;
identify, when the share window is in an active share state, a position of a first window on the display device with respect to the share window, wherein the position of the first window is movable with respect to the share window; and
share, based upon the position of the first window on the display device being within at least a position of the share window, content data contained within the first window to the display device of at least one other user in communication with the information handling device of the user.

* * * * *